(12) United States Patent
Kuo (10) Patent No.: US 8,517,224 B2
(45) Date of Patent: Aug. 27, 2013

(54) OIL FLOW CONTROL STRUCTURE FOR GREASE GUN

(75) Inventor: Wen-I Kuo, Taichung (TW)

(73) Assignee: Suction Industrial Co., Ltd., Taichung (TW)

( * ) Notice: Subject to any disclaimer, the term of this patent is extended or adjusted under 35 U.S.C. 154(b) by 206 days.

(21) Appl. No.: 13/072,161

(22) Filed: Mar. 25, 2011

(65) Prior Publication Data

US 2012/0241479 A1    Sep. 27, 2012

(51) Int. Cl.
*G01F 11/00* (2006.01)

(52) U.S. Cl.
USPC .................. 222/256; 184/28; 184/105.2

(58) Field of Classification Search
USPC ............. 222/251–256, 266, 275, 277, 280; 184/26, 27.2, 28, 27.4, 32, 105.2
See application file for complete search history.

(56) References Cited

U.S. PATENT DOCUMENTS

| | | | | |
|---|---|---|---|---|
| 1,659,950 A | * | 2/1928 | Goodman | 222/262 |
| 2,497,762 A | * | 2/1950 | Davis | 74/104 |
| 3,307,482 A | * | 3/1967 | Lauck | 417/287 |
| 3,329,789 A | * | 7/1967 | Sahrbacker | 200/522 |
| 3,470,821 A | * | 10/1969 | Robirds et al. | 417/486 |
| 3,872,274 A | * | 3/1975 | Piber | 200/43.17 |
| RE30,270 E | * | 5/1980 | Piber | 200/43.17 |
| 4,664,298 A | * | 5/1987 | Shew | 222/287 |
| D295,599 S | * | 5/1988 | Shew | D8/14.1 |
| 5,277,339 A | * | 1/1994 | Shew et al. | 222/256 |
| 7,579,563 B2 | * | 8/2009 | Inagaki et al. | 200/43.17 |
| 8,235,253 B2 | * | 8/2012 | Shew et al. | 222/256 |
| 2012/0031929 A1 | * | 2/2012 | Guo | 222/323 |
| 2012/0285996 A1 | * | 11/2012 | Wu | 222/323 |

* cited by examiner

*Primary Examiner* — Kevin P Shaver
*Assistant Examiner* — Michael Melaragno
(74) *Attorney, Agent, or Firm* — Wang Law Firm, Inc.; Li K. Wang; Stephen Hsu (57) ABSTRACT

An oil flow control structure for grease gun has a hollow main body. An inflow end and an outflow end are respectively disposed at two sides of the main body. A high pressure passage and a low pressure passage, in which its inner diameter is larger than the high pressure passage, are disposed between the inflow end and the outflow end. A first pumping rod and a second pumping rod are respectively disposed in the two passages. The first pumping rod is pivoted to a pressing stem. The second pumping rod is pivoted to the pressing stem through a switching mechanism. The switching mechanism can regulate a pivot position of the second pumping rod relative to the pressing stem so that an initial position of the second pumping rod performing piston motion in the low pressure passage can be changed to seal or open the second inflow port.

4 Claims, 8 Drawing Sheets

OIL FLOW CONTROL STRUCTURE FOR GREASE GUN

BACKGROUND OF THE INVENTION

1. Field of the Invention

The present invention relates to a grease gun, and more particularly to an oil flow control structure for grease gun that regulates outlet pressure according to user demands.

2. Description of the Related Art

Figure 8:
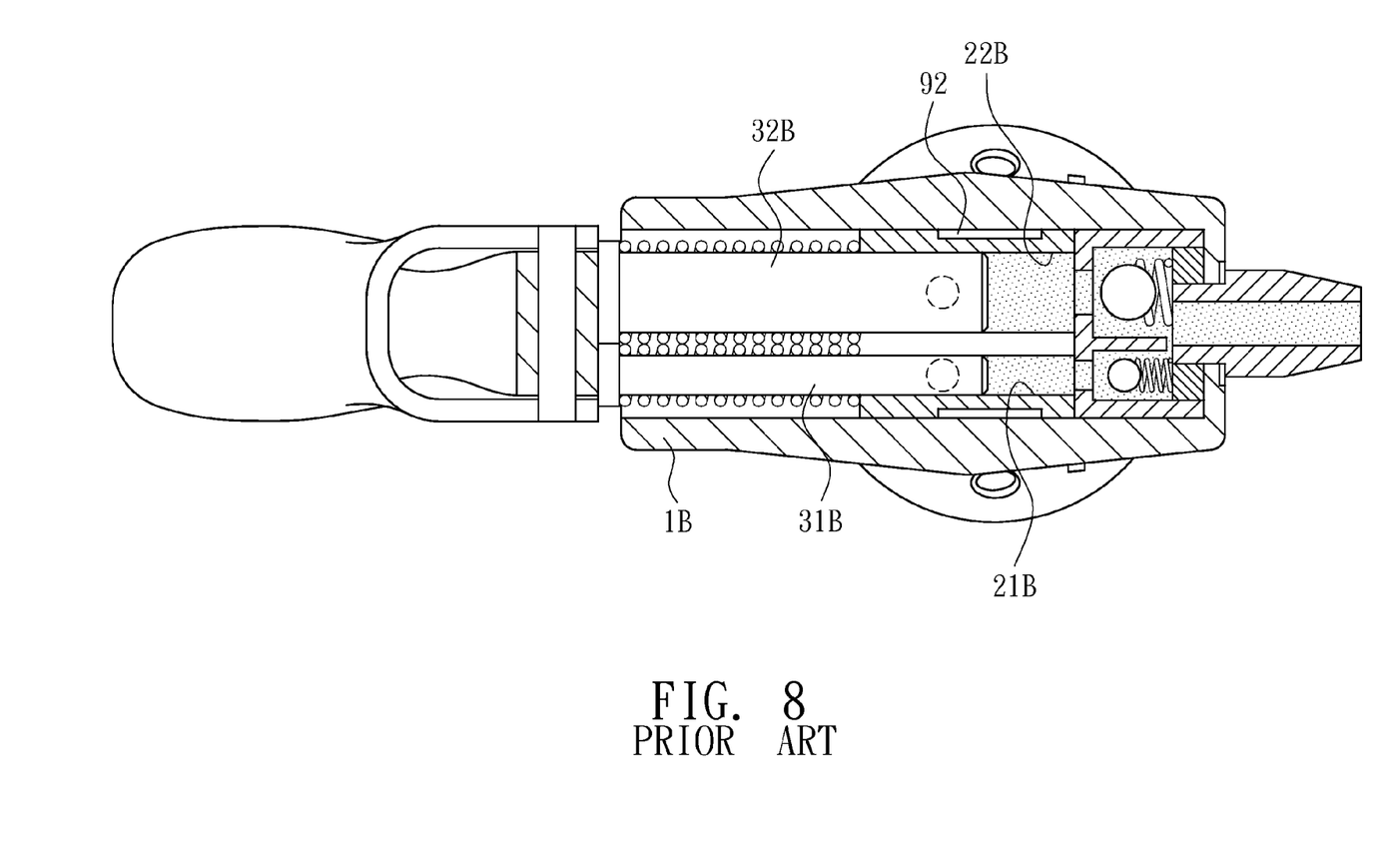
FIG. 8 is a cross-sectional drawing at a bird's view of a conventional grease gun.
Figure 9:
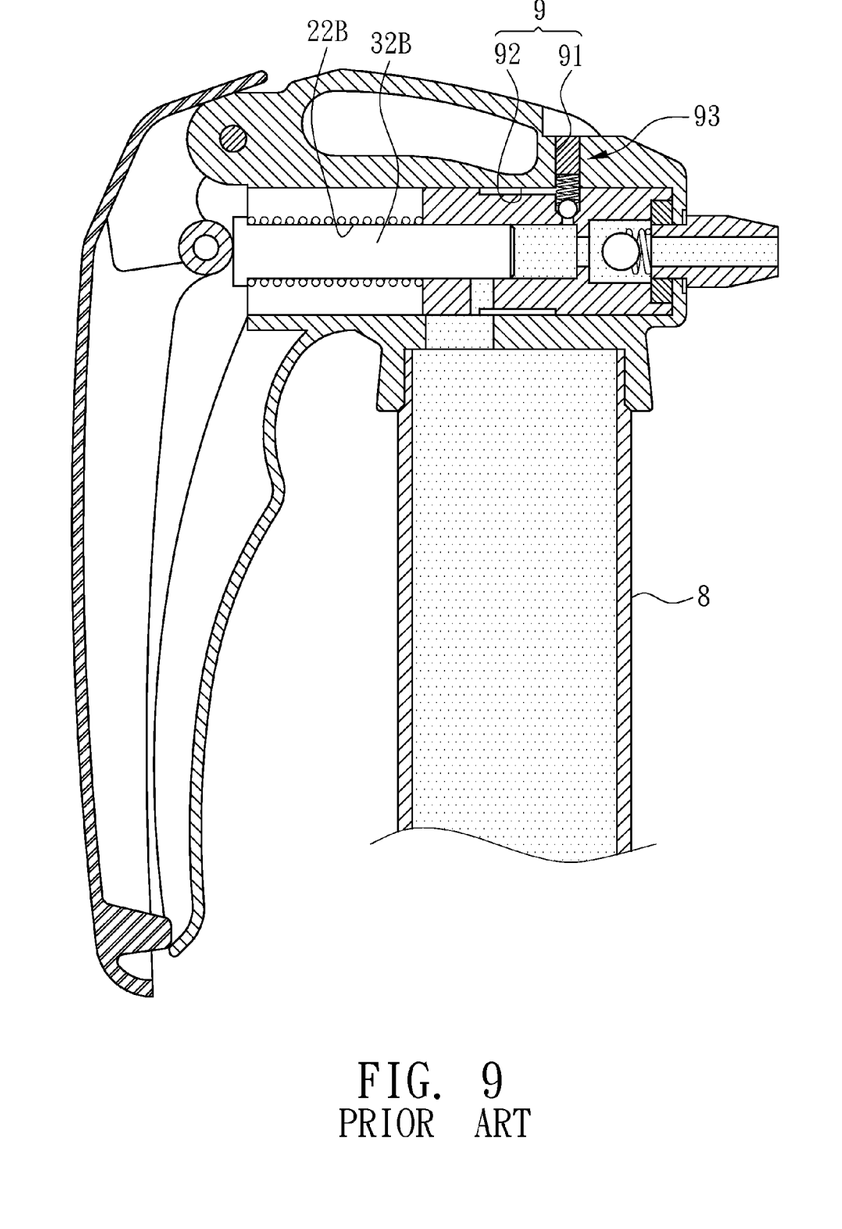
FIG. 9 is a cross-sectional side drawing of a conventional grease gun.

As shown in FIG. 8 and FIG. 9, a structure of grease gun having dual-pumping rods is disclosed. A high pressure passage 21B and a low pressure passage 22B are disposed in a main body 1B. A first pumping rod 31B and a second pumping rod 32B are respectively disposed in the high pressure passage 21B and the second pressure passage 22B. The first pumping rod 31B and the second pumping 32B can perform piston motions along an axis of the rod to push grease within the high pressure passage 21B and the low pressure passage 22B. In addition, a drainage portion 9 is disposed between the low pressure passage 22B and the inflow end 11B. The drainage portion 9 comprises a split-flow hole 91 and a slot way 92 circularly disposed, thereby communicating with the low pressure passage 22B. A normal close valve 93 is disposed to the split-flow hole 91 to prevent the low pressure passage 22B from communicating with the slot way 92. When counteracting force received by the second pumping rod 32B performing piston motion that outwardly pushes grease exceeds a predetermined value, the normal close valve 93 is pushed by the pressure of grease to conduct the low pressure passage 22B and the slot way 92 such that grease within the low pressure passage 22B is pushed by the second pumping rod 32B to return to a grease barrel 8, and only grease within the high pressure passage 21B can be pushed out.

The foregoing design can use two passages with different cross-sectional areas to generate oil injection pressures having different high low pressure. However, it may need enormous components. The processing procedure is also complicated during the production process to cause difficult production and extremely high cost.

SUMMARY OF THE INVENTION

In view of the shortcomings of the prior art, the inventor(s) of the present invention based on years of experience in the related industry to conduct extensive researches and experiments, and finally developed an oil flow control structure for grease gun as a primary objective that has simple structure and easy assembly and that can be easily produced to further reduce the production cost.

To achieve the foregoing objective, the oil flow control structure for grease gun provided by the invention comprises:

a hollow main body, two opposite side ends of the main body respectively opened with an inflow end and an outflow end to allow fluid initially flowing in and finally flowing out;

a high pressure passage and a low pressure passage, in which an inner diameter is greater than the high pressure passage, disposed between the inflow end and the outflow end, one ends of the two passages respectively disposed with a high pressure outflow port and a low pressure outflow port communicating with the outflow end, one sides of the two passages respectively disposed with a first inflow port and a second inflow port communicating with an inner space of the main body, a first pumping rod and a second pumping rod respectively slid in the two passages;

a pressing stem, a first pivot of the pressing stem pivoted to an end of an impeding member while another end of the impeding member is pivoted to the main body, the first pumping rod pivoted to the pressing stem, the second pumping rod pivoted to the pressing stem through a switching mechanism so that when the pressing stem performs relative swing by taking the first pivot as an axis, the first pumping rod and the second pumping rod are simultaneously linked to respectively perform piston motions in the high pressure passage and the low pressure passage, while pulling the pressing stem, ends of the first pumping rod and the second pumping rod that are not pivoted to the pressing stem exactly leaning against edges of the first inflow port and the second inflow port without preventing the high pressure passage and the low pressure passage from communicating with the main body, wherein the switching mechanism changes a position of the second pumping rod relative to the pressing stem, and a position of the second pumping rod relative to the low pressure passage is also changed, and while pulling the pressing stem, one end of the second pumping rod that is not pivoted to the pressing stem exactly seals the second inflow port to prevent the low pressure passage from communicating with the main body.

DETAILED DESCRIPTION OF THE PREFERRED EMBODIMENTS

The foregoing and other technical characteristics of the present invention will become apparent with the detailed description of the preferred embodiments and the illustration of the related drawings.

With reference to FIG. 1 to FIG. 7, a grease gun in accordance with the invention has a hollow main body 1. Opposite side ends of the main body 1 are respectively opened with an inflow end 11 and an outflow end 12 so that a grease barrel 8 at an outside is connected to the inflow end 11 to allow grease flowing into the main body 1. A high pressure passage 21 and a low pressure passage 22, in which its inner diameter is greater than the high pressure passage 21, are disposed between the inflow end 11 and the outflow end 12. One ends of the two passages are respectively disposed with a high pressure outflow port 212 and a low pressure outflow port 222 communicating with the outflow end 12, and a side of the two passages is respectively disposed with a first inflow port 211 and a second inflow port 221 communicating with an inner space of the main body 1. A first pumping rod 31 and a second pumping rod 32 are respectively slid in the two passages.

A first pivot 42 of a pressing stem 4 is pivoted to an end of an impeding member 41, and another end of the impeding member 41 is pivoted to the main body 1. Another end of the first pumping rod 31 is pivoted to the pressing stem 4 through a second pivot 5. The second pumping rod 32 is pivoted to the pressing stem 4 through a switching mechanism so that when the pressing stem 4 performs relative swing by taking the first pivot 42 as an axis, the first pumping rod 31 and the second pumping rod 32 can be simultaneously linked to respectively perform piston motion within the high pressure passage 21 and the low pressure passage 22 to push grease within the high pressure passage 21 and the low pressure passage 22. While pulling the pressing stem 4, ends of the first pumping rod 31 and the second pumping rod 32 that are not pivoted to the pressing stem 4 respectively lean against edges of the first inflow port 211 and the second inflow port 221 without preventing the high pressure passage 21 and the low pressure passage 22 from communicating with the main body 1, wherein the switching mechanism can change the position of the second pumping rod 32 relative to the pressing stem 4, and the position of the second pumping rod 32 relative to the low pressure passage 22 is also changed. While pulling the pressing stem 4, one end of the second pumping rod 32 that is not pivoted to the pressing stem 4 exactly seals the second inflow port 221 to prevent the low pressure passage 22 from communicating with the main body 1.

The switching mechanism comprises a movable pivot 6 and a pivot hole 71 and an elongated sliding hole 73 disposed to the pressing stem 4 and correspondingly pivoted to the movable pivot 6, wherein the pivot hole 71 is disposed to the pressing stem 4 and relatively near the main body 1. The elongated sliding hole 73 is disposed to the pressing stem 4 and relatively distant from the main body 1. The distance between the pivot hole 71 and the elongated sliding hole 73 corresponds to the width of the second inflow port 221. A top of the elongated sliding hole 73 aligns the pivot hole 71, and a channel 72, in which its inner diameter is smaller, communicates with the pivot hole 71 and has a distance section extended toward a bottom of the pressing stem 4.

Figure 1:
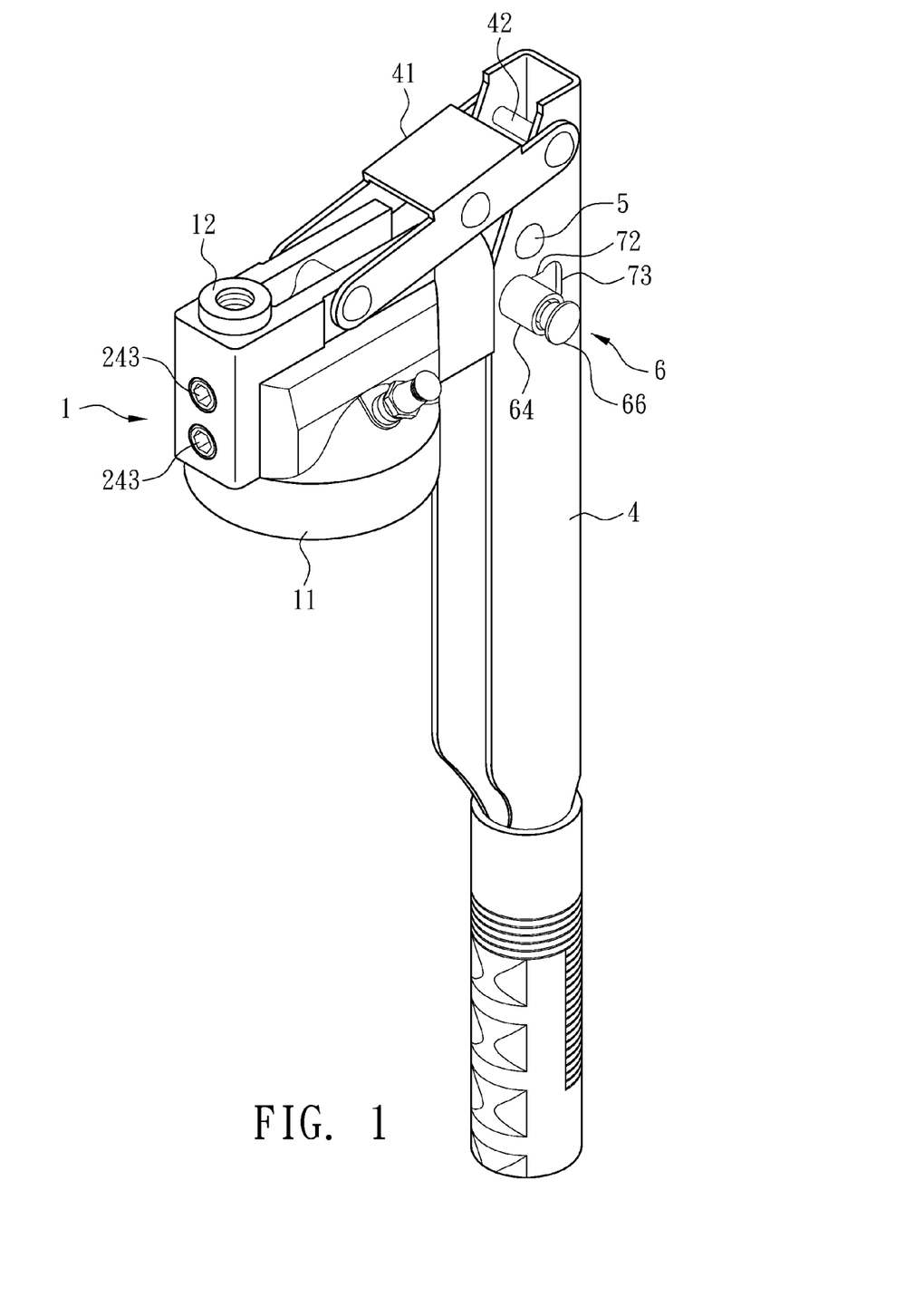
FIG. 1 is a three-dimensional assembly drawing according to the invention.
Figure 2:
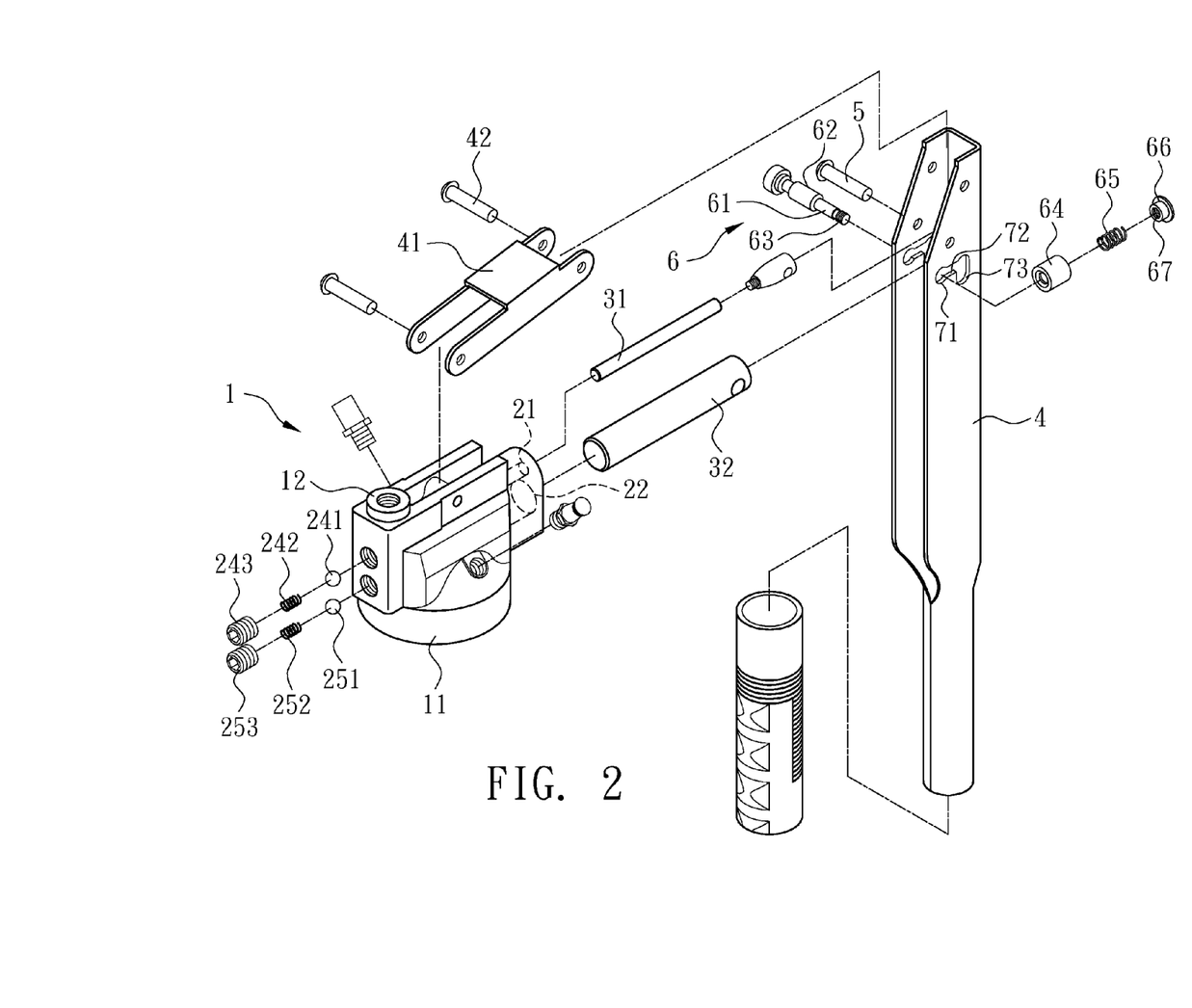
FIG. 2 is a three-dimensional decomposition drawing according to the invention.
Figure 3:
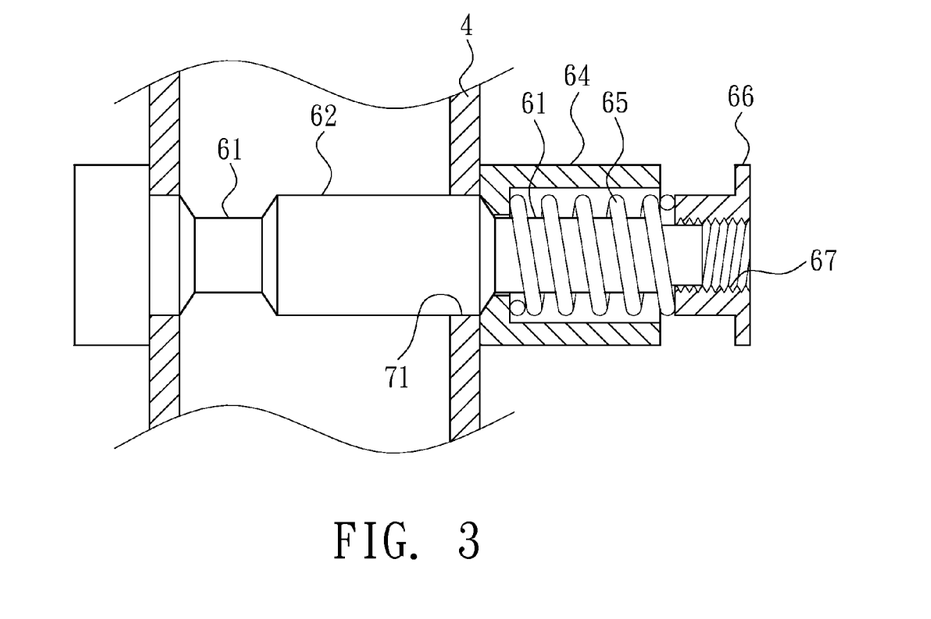
FIG. 3 is a state for a movable pivot that is not pressed.
Figure 4:
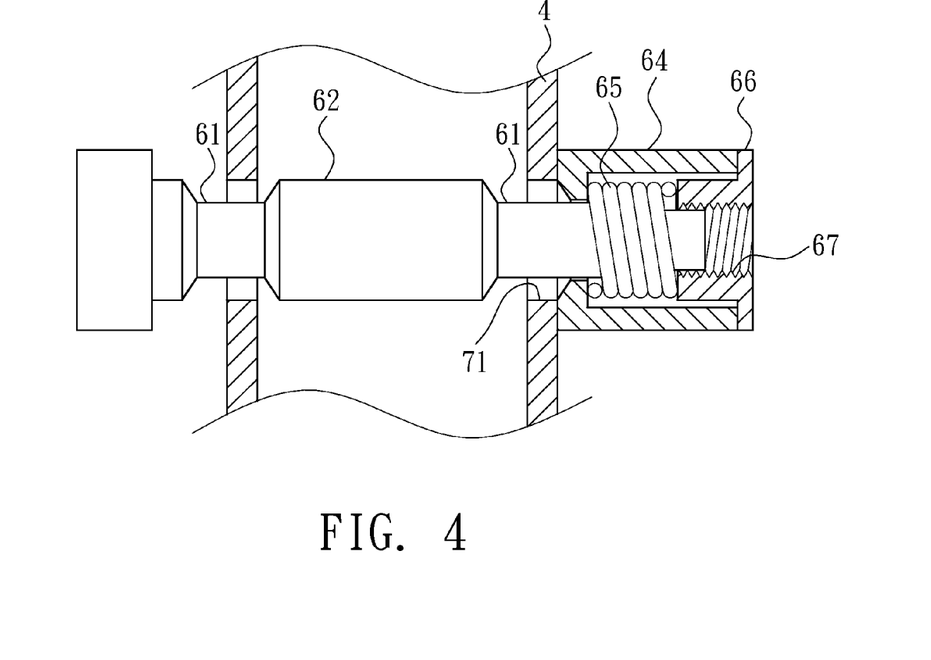
FIG. 4 is a state for a movable pivot that is pressed.

The movable pivot 6 has a shaft body having two different external diameters, in the embodiment as shown in FIG. 3 and FIG. 4, the shaft body 61 capable of passing through the channel 72 to selectively position in the pivot hole 71 or the elongated sliding hole 73. A protrusion portion 62, in which an external diameter is greater than the channel 72, is circularly disposed to a portion of the shaft body 61. When the second pumping rod 32 is pivoted in the pivot hole 71 or the elongated sliding hole 73 through the movable pivot 6, an initial position of the protrusion 62 is latched in the pivot hole 71 or the elongated sliding hole 73 and may not pass through the channel 72 to reach another pivot position. Further, another end of the movable pivot 6 is disposed with an external screw thread 63 and fit to a fixing sheath 64, a spring 65 and a push button 66 in order, wherein the fixing sheath 64 is a cylinder having a pierced center. The central space of the fixing sheath is fit with the shaft body 61 of the movable pivot and the spring 65, and its side wall of the fixing sheath leans against the pressing stem 4. The push button 66 also has a pierced center and is disposed with an inner screw thread 67 to allow the spring 65 at a compressed state to screw the push button 66 and the shaft body 61 of the movable pivot. Accordingly, the push button 66 can be pressed to link the movable pivot 6 to shift such that the protrusion portion 62 leaves borders of the pivot hole 71 or the elongated sliding hole 73 to enable the shaft body 61 of the movable pivot sliding in the channel 72, thereby switching at different pivot positions.

Figure 5:
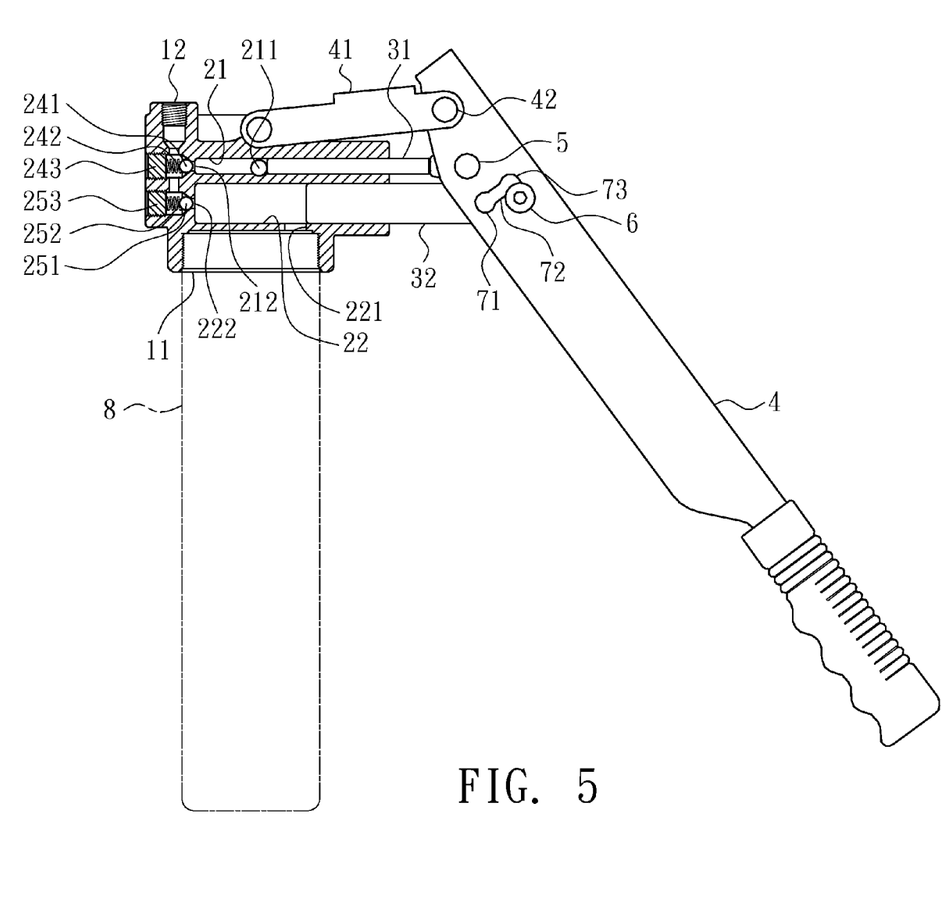
FIG. 5 is a cross-sectional drawing I of low pressure output state according to the invention.
Figure 6:
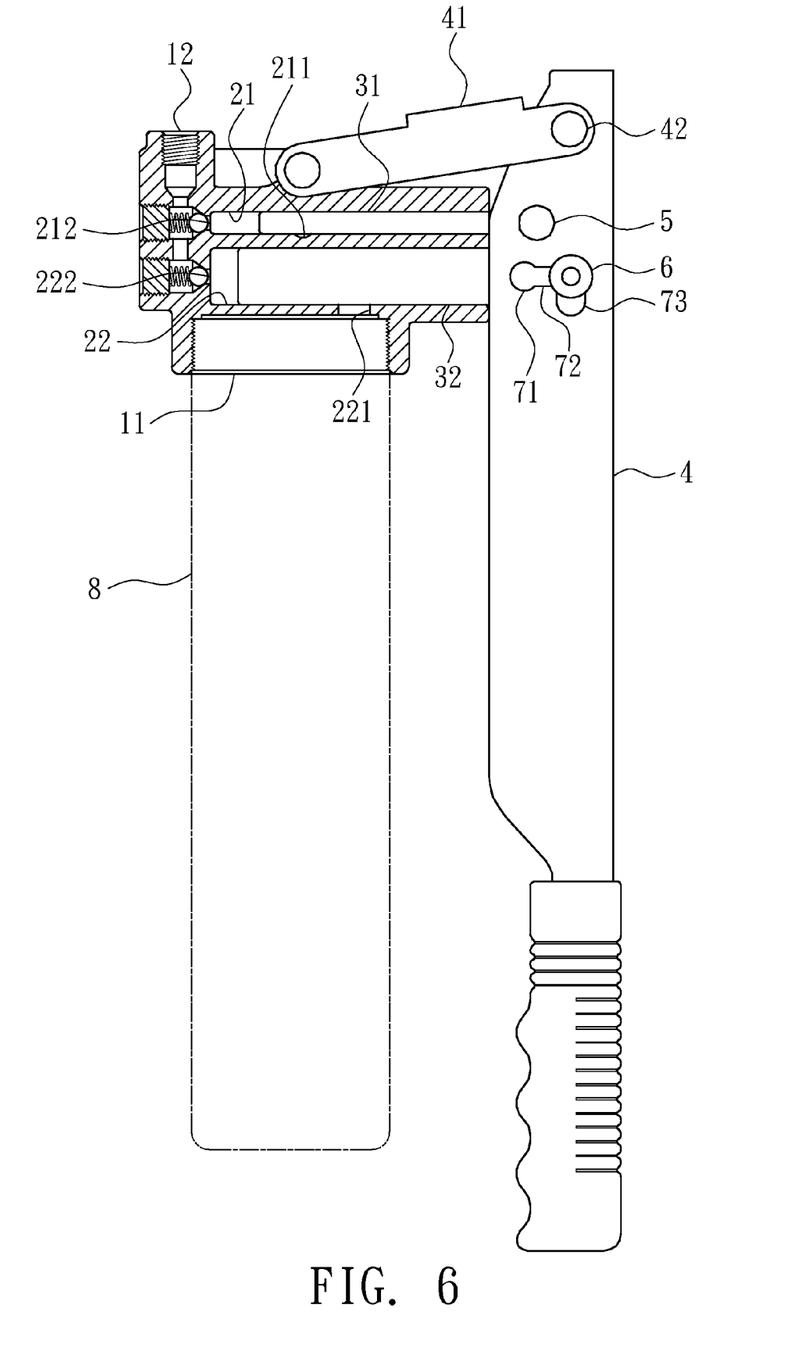
FIG. 6 is a cross-sectional drawing II of low pressure output state according to the invention.
Figure 7:
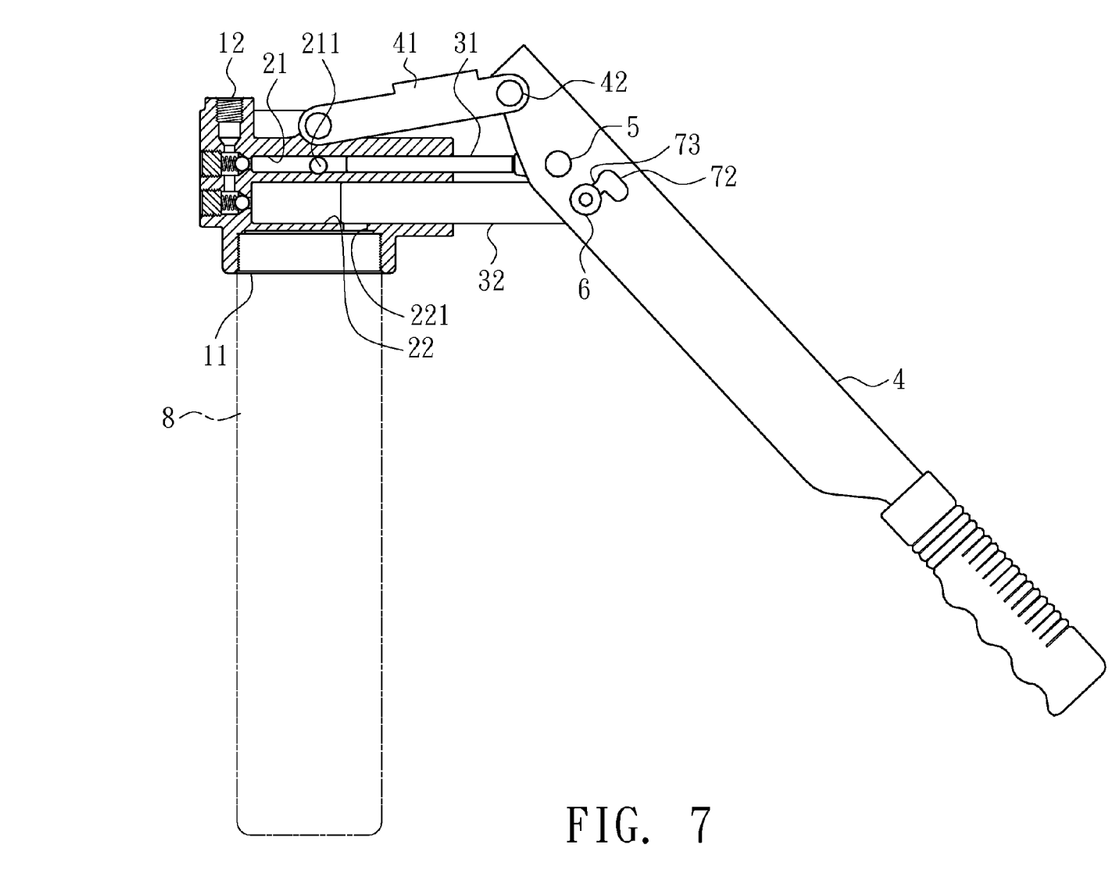
FIG. 7 is a cross-sectional drawing of high pressure output state according to the invention.

As shown in FIG. 5 to FIG. 7, a user can switch the pivot position of the movable pivot 6 that is around the pivot hole 71 or the elongated sliding hole 73 upon demands to regulate the pressure of grease at the outlet. While pulling the pressing stem 4 to allow the first pumping rod 31 and the second pumping rod 32 to locate the initial position of the piston motion, the pivot position of the movable pivot 6 is switched to reach the elongated sliding hole 73. Since the length of the first pumping rod 31 is smaller than the distance between the first inflow port 211 and the second pivot 5, the first pumping rod 31 may not seal the first inflow port 211. The length of the second pumping rod 32 exactly leans against the edge of the second inflow port 221 and may not seal the second inflow port 221 as well. Therefore, grease from the inflow end 11 can flow into the high pressure passage 21 and the low pressure passage 22 so that grease can be pushed by the first pumping rod 31 and the second pumping rod 32 to form an output state at a low pressure and a mass flow rate. If the pivot position of the movable pivot 6 is switched to the pivot hole 71, the distance between the pivot hole 71 and the elongated sliding hole 73 corresponds to the width of the second inflow port 221 so that position of the second pumping rod 32 is forwardly translated to exactly seal the second inflow port 221. The position of the first pumping rod 31 is not changed so that grease is pushed by the first pumping rod 31 to form an output state at a high pressure after flowing into the high pressure passage 21 from the first inflow port 211 during the piston motion stroke.

Moreover, steel balls 241, 251, springs 242, 252 and fastening members 243, 253 are sequentially and respectively disposed at a high pressure outflow port 212 and a low pressure outflow port 222 to normally seal the high outflow port 212 and the low pressure outflow port 222. When the pressing stem 4 is pushed by forces to link first pumping rod 31 and the second pumping rod 32 to push grease within the high pressure passage 21 and the low pressure passage 22, the steel balls 241, 251 is backwardly shifted due to grease pressure. The springs 242, 252 are further compressed to open the high pressure outflow port 212 and the low pressure outflow port 222 so as to conduct the two passages and the outflow end 12. While stopping the force imposing and pulling the pressing stem 4, the steel balls 241, 251 are affected by the flexible restoring force of the springs 242, 252 to restore and then seals the high pressure outflow port 212 and the low pressure outflow port 222, thereby preventing grease from being pumped again.

According to the invention, with different outlet pressures generated from the passages having two different cross-sectional areas, the pivot position of the movable pivot 6 is freely switched upon demands to regulate output state to match various application requirements. By comparing with the conventional grease gun, the invention does not have the design of a drainage portion and a normal close valve to have simple structure and processing procedure, thereby reducing the production cost.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. An oil flow control structure for grease gun comprising:
   a hollow main body respectively with an inflow end and an outflow end for a fluid flowing in and flowing out of the hollow main body;
   a high pressure passage and a low pressure passage, the low pressure passage having an inner diameter greater than an inner diameter of the high pressure passage, disposed between the inflow end and the outflow end, one end of the high pressure passage is connected to a high pressure outflow port and one end of the low pressure passage is connected to a low pressure outflow port, the high pressure outflow port and low pressure outflow port are in communicating with the outflow end, the high pressure passage being connected with a first inflow port and the low pressure passage being connected with a second inflow port, both the first inflow port and the second inflow port being in communicating with an inner space of the main body, a first pumping rod sliding inside the high pressure passage and a second pumping rod sliding inside the low pressure passage;

a pressing stem pivotally connected to one end of an impeding member through a first pivot, another end of the impeding member being pivotally connected to the main body, a first end of the first pumping rod being pivotally connected through a second pivot to the pressing stem, a first end of the second pumping rod being movably connected to the pressing stem through a switching mechanism, when the pressing stem swings around the first pivot, the first pumping rod and the second pumping rod respectively sliding inside the high pressure passage and the low pressure passage, when the pressing stem is at a pulled away position, a second end of the first pumping rod and a second end of the second pumping rod leaning respectively against the first inflow port and the second inflow port without preventing the high pressure passage and the low pressure passage from communicating with the main body, when the switching mechanism changes a position of the second pumping rod relative to the pressing stem, and a position of the second pumping rod relative to the low pressure passage is also changed, and when the pressing stem is at a pulled away position, the second end of the second pumping rod seals the second inflow port to prevent the low pressure passage from communicating with the main body, wherein when the pressing stem swings toward the main body, the first end of the first pumping rod rotates pivotally relative the second pivot and does not slide relative to the second pivot while the first pumping rod slides in the high pressure passage and the first end of the second pumping rod pivotally rotate relative to the switching mechanism and does not slide relative to the switching mechanism while the second pumping rod slides in the low pressure passage.

2. The oil flow control structure for grease gun as recited in claim 1, wherein the switching mechanism comprises a pivot hole connected to an elongated sliding hole, both the pivot hole and the elongated sliding hole disposed on the pressing stem, and a pivot movably transitioning between the pivot hole and the elongated sliding hole, wherein the pivot hole is disposed to the pressing stem and relatively near the main body, and the elongated sliding hole is disposed to the pressing stem and relatively distant from the main body, a distance between the pivot hole and the elongated sliding hole corresponds to a width of the second inflow port, and a top of the elongated sliding hole aligns with the pivot hole, and a channel, having a width smaller than a diameter of the pivot hole, connects the pivot hole to the elongated sliding hole, and the movable pivot has a shaft body having two different external diameters, and the shaft body having a smaller external diameter shuttles around the channel to switch a pivot position to reach the pivot hole or the elongated sliding hole while the shaft body having a larger external diameter, located between two walls of the pressing stem, is positioned in the pivot hole or the elongated sliding hole and is unable to pass through the channel to reach another pivot position.

3. The oil flow control structure for grease gun as recited in claim 1, wherein the high pressure passage and the low pressure passage are vertically arranged in order, and the high pressure passage is disposed onto the low pressure passage.

4. The oil flow control structure for grease gun as recited in claim 1, wherein a baffle block, a flexible member and a fastening member are sequentially disposed to outsides of the high pressure outflow port and the low pressure outflow port.

\* \* \* \* \*